(12) United States Patent
Pedersen et al.

(10) Patent No.: US 10,719,177 B2
(45) Date of Patent: Jul. 21, 2020

(54) EXCITATION VOLTAGES FOR TOUCH SENSORS

(71) Applicant: Atmel Corporation, San Jose, CA (US)

(72) Inventors: Trond Jarle Pedersen, Trondheim (NO); John Stanley Dubery, Hants (GB)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 15/188,680

(22) Filed: Jun. 21, 2016

(65) Prior Publication Data

US 2017/0364174 A1 Dec. 21, 2017

(51) Int. Cl.
*G06F 3/044* (2006.01)

(52) U.S. Cl.
CPC .... *G06F 3/044* (2013.01); *G06F 2203/04101* (2013.01); *G06F 2203/04105* (2013.01)

(58) Field of Classification Search
CPC ................ G06F 3/03547; G06F 3/044; G06F 2203/04105; G06F 2203/04101
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,436,679 B1 * | 5/2013 | Alzaher | H03H 11/1256 327/556 |
| 8,648,845 B2 * | 2/2014 | Chang | G09G 3/3614 345/211 |

(Continued)

FOREIGN PATENT DOCUMENTS

WO WO 2012/129247 A2 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Jeff Piziali
(74) *Attorney, Agent, or Firm* — Baker Botts L.L.P.

(57) ABSTRACT

A method including applying a first excitation voltage to an electrode of a touch sensor which charges a capacitive node associated with the electrode from a first voltage level to a second voltage level that is greater than the first voltage level. A first measurement measures a charge to change from the first voltage level to the second voltage level. A second excitation voltage is applied to the electrode which charges the capacitive node from the second voltage level to a third voltage level that is greater than the second voltage level. The capacitive node is discharged from the third voltage level to a fourth voltage level that is less than the second voltage level. A second measurement measures a charge to change from the third voltage level to the fourth voltage level. A measured charge signal is generated based on the first measurement and the second measurement.

8 Claims, 7 Drawing Sheets

(56) References Cited

U.S. PATENT DOCUMENTS

| | | |
|---|---|---|
| 8,723,824 B2 | 5/2014 | Myers |
| 9,135,845 B2* | 9/2015 | Lee, II .................. G09G 3/003 |
| 9,183,799 B2* | 11/2015 | Hotelling ............. G09G 3/3614 |
| 9,252,769 B2* | 2/2016 | Lundstrum ........ H03K 17/9622 |
| 9,257,980 B2* | 2/2016 | Lundstrum ........ H03K 17/9622 |
| 2008/0309635 A1 | 12/2008 | Matsuo |
| 2009/0315854 A1 | 12/2009 | Matsuo |
| 2011/0063154 A1* | 3/2011 | Hotelling ............. H03M 3/494 341/143 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0043279 A1* | 2/2014 | Pedersen ............... G06F 3/0416 345/174 |
| 2014/0292704 A1* | 10/2014 | Cleary ................... G06F 3/044 345/174 |

* cited by examiner

EXCITATION VOLTAGES FOR TOUCH SENSORS

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance occurs within the touch screen at a position of the touch sensor of the touch screen that corresponds to the position of the object within the touch sensitive area of the touch sensor. A touch sensor controller measures the capacitance of a touch sensor. When a significant change in capacitance is measure that is taken to indicate the presence of an object touching or near the touch sensor. In addition, when significant change in capacitance is measured the touch sensor controller processes that change to determine the location of the object that caused the change.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Disclosed herein are various embodiments for generating and measuring asymmetric excitation signals for self-capacitance touch sensors. An asymmetric excitation signal is a drive signal that is used to increase the signal swing of the excitation signal to increase the signal-to-noise ratio (SNR). Generating an asymmetric excitation signal comprises providing a first excitation voltage to a capacitive node in a touch sensor and measuring a positive swing of a voltage signal as the capacitive node charges. A second excitation voltage with a voltage magnitude that is greater than the first excitation voltage is then applied to the capacitive node. The capacitive node is then discharged and negative swing of the voltage signal is measured as the capacitive node discharges. The negative swing has a greater voltage magnitude than the positive swing. External low frequency noise that is measured while measuring the positive swing and the negative swing can be substantially canceled out to improve the SNR of the touch sensor.

Figure 1:
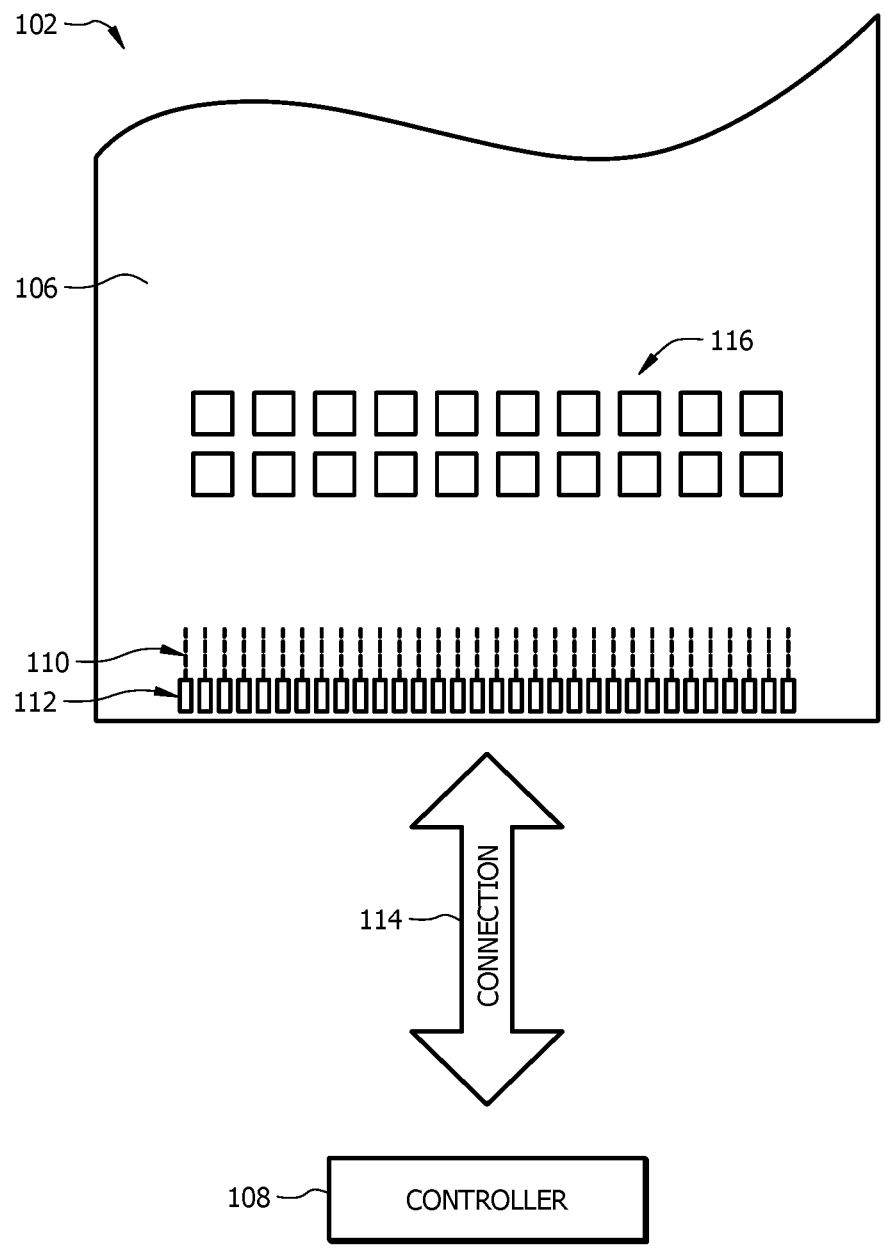
FIG. 1 illustrates an example system that includes a touch sensor, according to an embodiment of the present disclosure.

FIG. 1 illustrates an example system that includes a touch sensor 102, according to an embodiment of the present disclosure. Touch sensor 102 includes touch sensor array 106 and touch sensor controller 108. Touch sensor array 106 and touch sensor controller 108 are configured to detect the presence and position of a touch within a touch-sensitive area of touch sensor array 106. Moreover, in one embodiment, touch sensor array 106 and touch sensor controller 108 are also configured to detect an object positioned with a detectable proximity of (e.g. hovering above) the touch-sensitive area of touch sensor array 106 as well as a position within the touch-sensitive area of touch sensor array 106 associated with the detected object based on which touch sensors (e.g. which drive and sense electrodes) of the touch sensor array 106 cause the object to be detected.

Touch sensor array 106 includes one or more touch-sensitive areas. In one embodiment, touch sensor array 106 includes an array of electrodes disposed on one or more substrates, which may be made of a dielectric material. Reference to a touch sensor array may encompass both the electrodes of touch sensor array 106 and the substrate(s) on which they are disposed. Alternatively, reference to a touch sensor array may encompass the electrodes of touch sensor array 106, but not the substrate(s) on which they are disposed. Examples of touch sensor arrays 106 may include, but are not limited to, touch screens, sliders, and buttons.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106. One or more characteristics of the implementation of those shapes (such as, for example, the conductive materials, fills, or patterns within the shapes) constitute in whole or in part one or more micro-features of touch sensor array 106. One or more macro-features of a touch sensor array 106 may determine one or more characteristics of its functionality, and one or more micro-features of touch sensor array 106 may determine one or more optical features of touch sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

In an embodiment, a mechanical stack contains the substrate (or multiple substrates) and the conductive material forming the electrodes of touch sensor array 106. For example, the mechanical stack may include a first layer of optically clear adhesive (OCA) beneath a cover panel. The cover panel may be clear and made of a resilient material for repeated touching, such as for example glass, polycarbonate, or poly (methyl methacrylate) (PMMA). This disclosure contemplates the cover panel being made of any transparent (or at least semi-transparent) material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 106 may be made of polyethylene terephthalate (PET) or another material. This disclosure contemplates any substrate with portions made of any material(s). In one embodiment, one or more electrodes in touch sensor array 106 are made of ITO in whole or in part. Additionally or alternatively, one or more electrodes in touch sensor array 106 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

In one embodiment, touch sensor array 106 implements a capacitive form of touch sensing. In a mutual-capacitance implementation, touch sensor array 106 may include an array of drive and sense electrodes forming an array of capacitive nodes 116. A drive electrode and a sense electrode may form a capacitive node 116. The drive and sense electrodes forming capacitive node 116 are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 108) induces a charge on the sense electrode, and the amount of charge induced is susceptible to external influence (such as a touch or a hovering object). When an object touches or comes within proximity of capacitive node 116, a change in capacitance may occur at capacitive node 116 and touch sensor controller 108 measures the change in capacitance. By measuring changes in capacitance throughout the array, touch sensor controller 108 determines the potential of capacitive node 116 and/or the position of the touch or proximity within touch-sensitive areas of touch sensor array 106.

In a self-capacitance implementation, touch sensor array 106 may include an array of electrodes of a single type that may each form a capacitive node 116. When an object touches or comes within proximity of capacitive node 116, a change in self-capacitance may occur at capacitive node 116 and touch sensor controller 108 measures the change in capacitance, for example, as a change in the amount of charge implemented to raise the voltage at capacitive node 116 by a predetermined amount. As with a mutual-capacitance implementation, by measuring changes in capacitance throughout the array, touch sensor controller 108 determines the potential of capacitive node 116 and/or the position of the touch or proximity within touch-sensitive areas of touch sensor array 106. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 106 includes drive and sense electrodes disposed in a pattern on one side of a single substrate. In such a configuration, a pair of drive and sense electrodes capacitively coupled to each other across a space between them form a capacitive node 116. As an example self-capacitance implementation, electrodes of a single type are disposed in a pattern on a single substrate. In addition or as an alternative to having drive and sense electrodes disposed in a pattern on one side of a single substrate, touch sensor array 106 may have drive electrodes disposed in a pattern on one side of a substrate and sense electrodes disposed in a pattern on another side of the substrate. Moreover, touch sensor array 106 may have drive electrodes disposed in a pattern on one side of one substrate and sense electrodes disposed in a pattern on one side of another substrate. In such configurations, an intersection of a drive electrode and a sense electrode forms a capacitive node 116. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node 116 of touch sensor array 106 may indicate a touch or proximity input at the position of capacitive node 116. Touch sensor controller 108 detects and processes the change in capacitance to determine the potential of capacitive node 116 and/or the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as for example general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an example implementation, touch sensor controller 108 includes a processor unit, a drive unit, a sense unit, and a storage unit. In such an implementation, the drive unit supplies drive signals to the drive electrodes of touch sensor array 106, and the sense unit senses charge at the capacitive nodes 116 of touch sensor array 106 and provides measurement signals to the processor unit representing capacitances at the capacitive nodes 116. The processor unit controls the supply of drive signals to the drive electrodes by the drive unit and processes measurement signals from the sense unit to detect and process the presence and position of a touch or proximity input within touch-sensitive areas of touch sensor array 106. The processor unit may also track changes in the potential of capacitive node 116 and/or the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 108 having a particular implementation with particular components, this disclosure contemplates touch sensor controller having other implementations with other components.

Tracks 110 of conductive material disposed on the substrate of touch sensor array 106 couple the drive or sense electrodes of touch sensor array 106 to connection pads 112, also disposed on the substrate of touch sensor array 106. As described below, connection pads 112 facilitate coupling of tracks 110 to touch sensor controller 108. Tracks 110 may extend into or around (e.g., at the edges of) touch-sensitive areas of touch sensor array 106. In one embodiment, particular tracks 110 provide drive connections for coupling touch sensor controller 108 to drive electrodes of touch sensor array 106, through which the drive unit of touch sensor controller 108 supplies drive signals to the drive electrodes, and other tracks 110 provide sense connections for coupling touch sensor controller 108 to sense electrodes of touch sensor array 106, through which the sense unit of touch sensor controller 108 senses charge at the capacitive nodes 116 of touch sensor array 106.

Tracks 110 are made of fine lines of metal or other conductive material. For example, the conductive material of tracks 110 may be copper or copper-based and have a width of approximately 100 µm or less. As another example, the conductive material of tracks 110 may be silver or silver-based and have a width of approximately 100 µm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, touch sensor array 106 may include one or more ground lines terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on an FPC. Connection pads 112 may be made of the same material as tracks 110 and may be bonded to the FPC using an anisotropic conductive film (ACF). In one embodiment, connection 114 includes conductive lines on the FPC coupling touch sensor controller 108 to connection pads 112, in turn coupling touch sensor controller 108 to tracks 110 and to the drive or sense electrodes of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

Figure 2A:
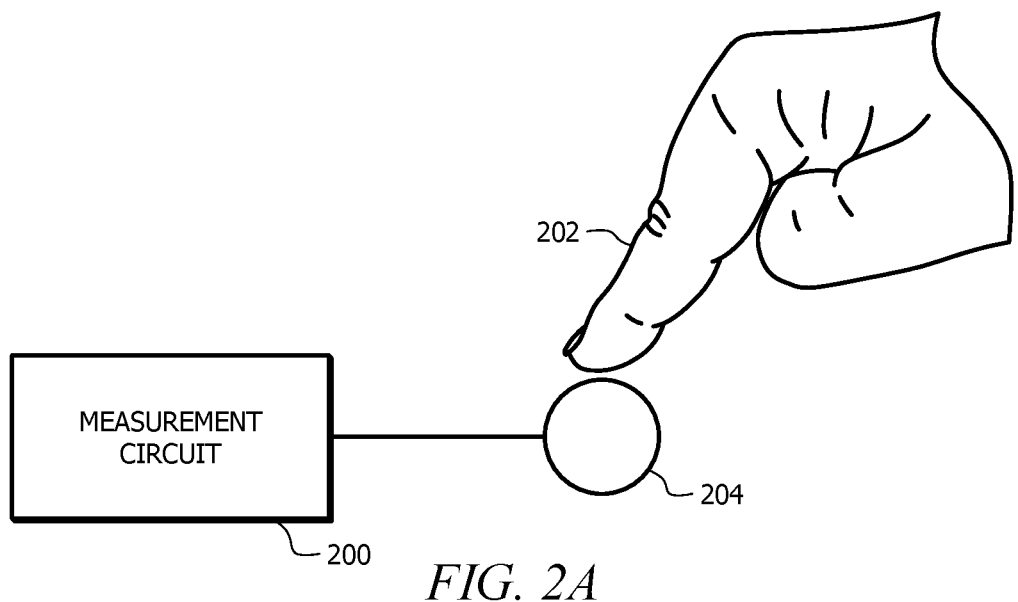
FIGS. 2A-2B illustrate an example of a self-capacitance measurement, according to an embodiment of the present disclosure.
Figure 2B:
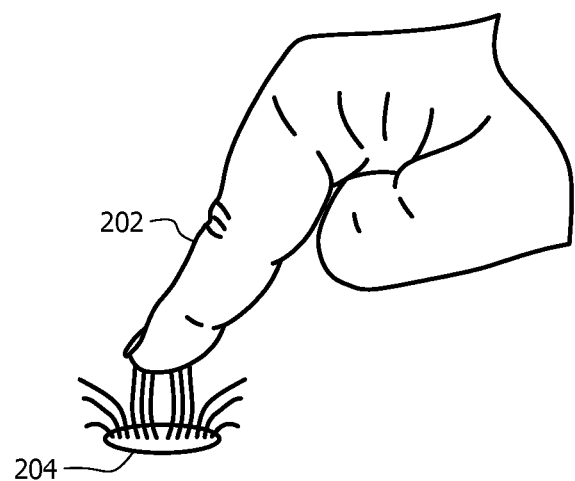

FIGS. 2A-2B illustrate an example of a self-capacitance measurement, according to an embodiment of the present disclosure. In FIG. 2A, an electrode 204 of touch sensor array 106 is coupled to a measurement circuit 200. As described below, electrode 204 forms a capacitance to ground that is distributed in free space. In an embodiment, the capacitance to ground includes multiple elements, such as for example, capacitance of the tracks in the silicon, tracks on the printed circuit board (PCB), electrodes 204 made of conductive material (ITO, copper mesh, etc.), or an object 202 providing an input to electrodes 204. For example, object 202 may be part of a human body, e.g., finger or palm, or a stylus. Electrode 204 has capacitive coupling to ground through the surrounding objects that are galvanically or capacitively connected to ground. As described above, measurement circuit 200 of touch sensor controller 108 transmits a drive signal and senses a signal indicative of a touch or proximity input from object 202, such as for example a finger, through electrode 204. In an embodiment, measurement circuit 200 of touch sensor controller 108 generates the drive signal transmitted by electrode 204 and senses the capacitance to ground. The capacitance of the surrounding material includes at least in part, the capacitance between electrode 204 and ground with object 202 providing the touch or proximity input. For example, the capacitance provided by object 202 providing the touch or proximity input may add 5-10% of the capacitance sensed by electrode 204.

In FIG. 2B, the signal transmitted by electrode 204 generates an electric field that emanates from electrode 204 to a signal ground of touch sensor array 106. The signal ground is galvanically or capacitively coupled to ground. The presence of an object 202, such as for example finger, affects the electric field and in turn the amount of charge sensed at electrode 204 by measurement circuit 200. As object 202 approaches electrode 204, the capacitance between electrode 204 and ground detected by measurement circuit 200 increases. In an embodiment, the increase of the capacitance between electrode 204 and ground may be measured by measurement circuit 200 as a decrease of voltage at the capacitance between electrode 204 and ground. In an embodiment, measurement circuit 200 may be alternately toggled between the drive and sense electrodes of a touch sensor in a mutual capacitance configuration. Although this disclosure describes the measurement circuit being integrated with a touch sensor controller, this disclosure contemplates a measurement circuit being a discrete circuit or part of any other circuit.

Figure 3:
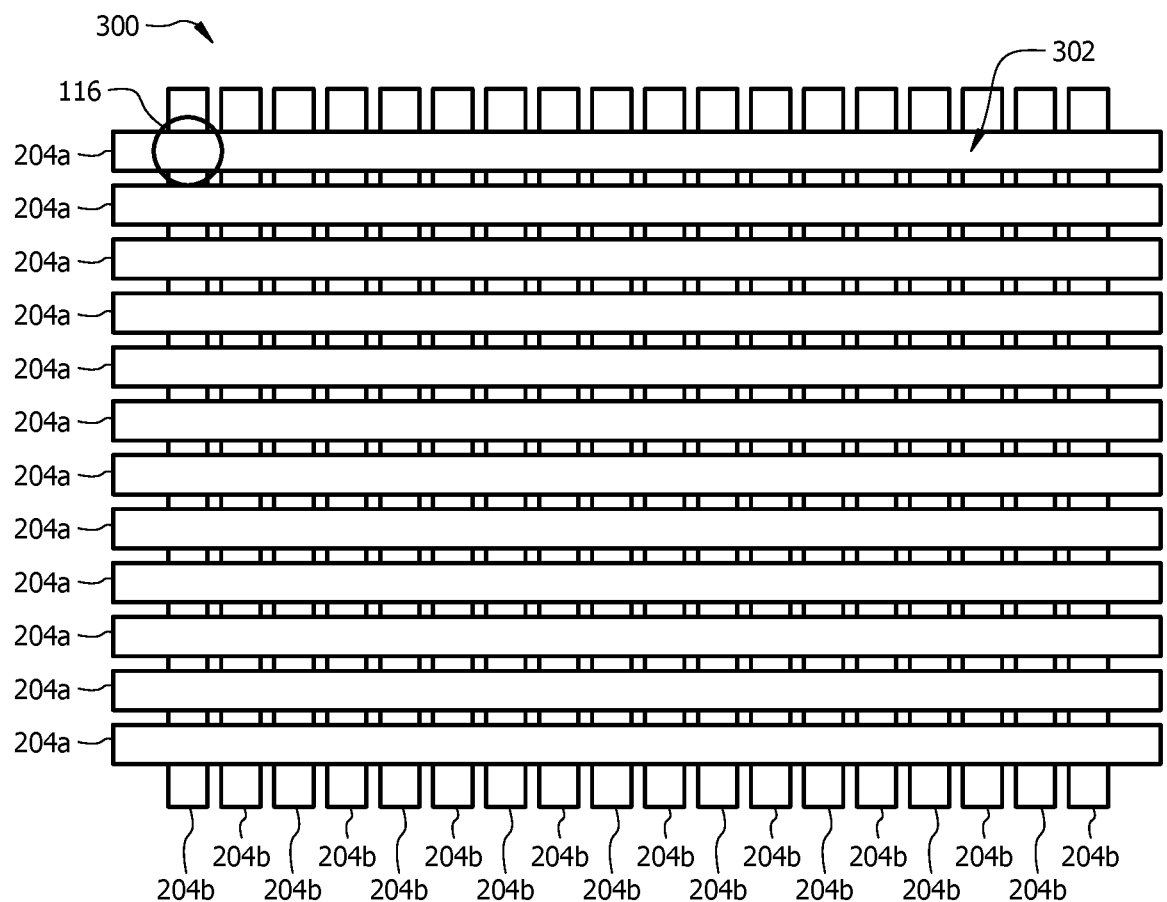
FIG. 3 illustrates in plan view an example arrangement of electrodes of a touch sensor, according to an embodiment of the present disclosure.

FIG. 3 illustrates in plan view an example arrangement of electrodes of a touch sensor, according to an embodiment of the present disclosure. Electrodes 204a are oriented in a first direction and electrodes 204b are oriented in a second direction different from the first direction, such that touch-sensitive area 402 of touch sensor array 106 is defined by the two-dimensional array of electrodes 204a and electrodes 204b. In the illustrated example, the first direction and the second direction are perpendicular to each other. Electrodes 204a and electrodes 204b may be described based on their orientation in touch sensor array 106. For example, electrodes oriented along a horizontal direction (electrodes 204a in the illustrated example) may be referred to as x-electrodes and electrodes oriented along a vertical direction (electrodes 204b in the illustrated example) may be referred to as y-electrodes.

Electrodes 204a and electrodes 204b overlap at points along the electrodes. In a mutual capacitive mode of operation, capacitive nodes 116 are formed at areas where electrodes 204 overlap when one of electrodes 204a and 204b operates as a drive electrode and the other of electrodes 204a and 204b operates as a sense electrode and when a drive signal is applied to the electrodes 204 operating as drive electrodes.

In an embodiment, electrodes 204a and electrodes 204b are disposed on the same side of a substrate. In such embodiments, to ensure that electrodes 204a and electrodes 204b are electrically isolated from one another, electrodes 204a and electrodes 204b are separated by a dielectric or other material at points where electrodes 204a and electrodes 204b overlap. In certain other embodiments, electrodes 204a and electrodes 204b are disposed on opposing sides of a substrate, the substrate being made of a dielectric or other material that electrically isolates electrodes 204a and electrodes 204b from one another. In certain other embodiments, electrodes 204a and electrodes 204b are disposed on respective surfaces of different substrates, which are positioned with respect to each other such that electrodes 204a and electrodes 204b are electrically isolated from each other at points where electrodes 204a and electrodes 204b overlap. For example, one or more of the substrates may be positioned between electrodes 204a (positioned on one of the substrates) and electrodes 204b (positioned on the other of the substrates) or an additional substrate, such as a dielectric substrate, or air gap is sandwiched between the two substrates on which electrodes 204a and electrodes 204b are formed.

Although this disclosure describes a touch sensor including electrodes 204 having particular orientations, this disclosure contemplates other touch sensors with electrodes having other orientations. Additionally, the particular shapes and arrangement of electrodes 204 shown and described with respect to FIG. 3 are provided for example purposes only. The present disclosure contemplates electrodes 204 having any shapes (or combination of shapes) and any arrangement (or combination of arrangement).

In an embodiment, electrodes 204b operate as drive electrodes and electrodes 204a operate as sense electrodes. In other embodiments, electrodes 204a operate as drive electrodes and electrodes 204b operate as sense electrodes. In an embodiment, both electrodes 204a and electrodes 204b operate as sense electrodes. In an embodiment, a portion or all of electrodes 204a are configurable to operate as sense electrodes during some measurements and as drive electrodes during other measurements. Additionally or alternatively, in an embodiment, a portion or all of electrodes 204b are configurable to operate as sense electrodes during some measurements and as drive electrodes during other measurements. As an example, during a first mode of operation, a portion or all of electrodes 204a and a portion or all of electrodes 204b operate as sense electrodes and during a second mode of operation, a portion or all of electrodes 204b operate as drive electrodes and a portion or all of electrodes 204a operate as sense electrodes.

Figure 4:
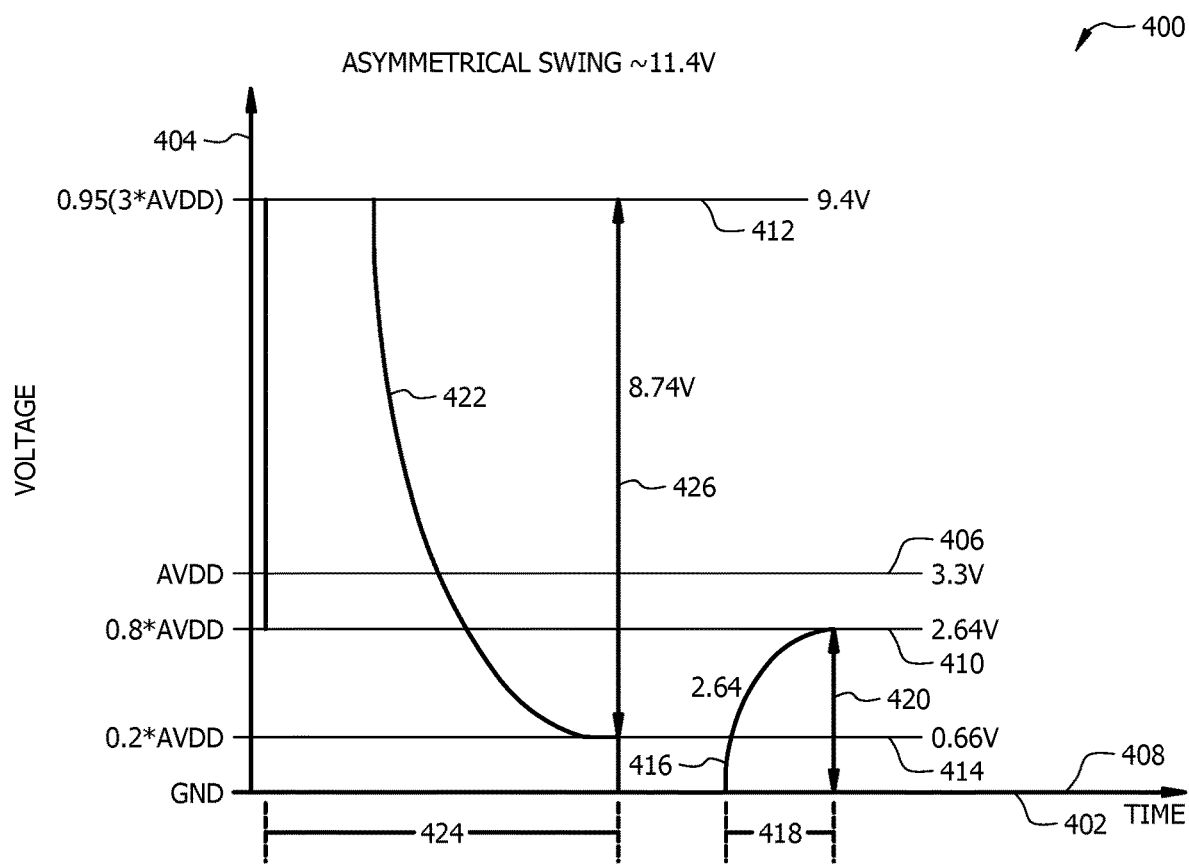
FIG. 4 illustrates a graph of an example of a charge response of a capacitive node in a touch sensor in response to various applied excitation voltages, according to an embodiment of the present disclosure.

FIG. 4 illustrates a graph 400 of example of a charge response of a capacitive node 116 in a touch sensor 102 in response to various applied excitation voltages, according to an embodiment of the present disclosure. A touch sensor controller 108 applies various excitation voltages to an electrode 204 of a capacitive node 116. In an embodiment, an excitation voltage is a voltage that is applied to the electrode 204 which charges capacitive node 116 to a known level (e.g. charge level or voltage level). FIG. 4 illustrates how the charge at capacitive node 116 changes in response to various excitation voltage levels being applied to the electrode 204. The amount of charge changes based on the applied excitation voltage level and may result in asymmetrical transitions as capacitive node 116 charges and discharges. Due to this asymmetric response, the excitation voltages may also be referred to as asymmetrical excitation voltages. The charge level changes of capacitive node 116 may be measured by a measurement circuit 200 to determine the potential of capacitive node 116 and/or to determine whether an object is proximate to capacitive node 116. An example of this process is described in FIG. 6.

Axis 402 indicates time, in microseconds for example, and axis 404 indicates voltage, in volts (V) for example. Graph 400 illustrates five voltage levels 406, 408, 410, 412, and 414. In an embodiment, one or more of the voltage levels are derived from or based on a reference voltage (AVDD) 406. In one embodiment, as illustrated in the example of FIG. 4, the reference voltage 406 is 3.3 V, a first voltage level 408 is set at ground (GND) or 0 V, a second voltage level 410 set to a first excitation voltage level which is set at 80% of the reference voltage 406 or 2.64 V, a third voltage level 412 is set at a second excitation voltage which is set at 95% of three times the reference voltage 406 or 9.4 V, and a fourth voltage level 414 is set at 20% of the reference voltage 406 or 0.66V. The voltage levels shown and described in FIG. 4 are provided for illustrative purposes only and not intended to be limiting. Alternatively, the voltage levels may be set at any other voltage as would be appreciated by one of ordinary skill in the art. In one embodiment, the first voltage level 408 and the fourth voltage level 414 are different voltage levels. For example, the first voltage level 408 and the fourth voltage level 414 may be different voltage levels to provide four different voltage levels for generating asymmetrical excitation voltages. In another embodiment, the first voltage level 408 and the fourth voltage level 414 are the same voltage level. For example, the first voltage level 408 and the fourth voltage level 414 may be the same to provide three voltage levels for generating asymmetrical excitation voltages.

Curve 416 represents a first charge change of capacitive node 116 in response to applying the first excitation voltage (i.e. the second voltage level 410), which corresponds with charging capacitive node 116. Throughout this disclosure, a charge change that corresponds with a transition to a higher charge level is also referred to as a positive swing. The first charge change transitions from a first charge level that corresponds with the first voltage level 408 (i.e. GND) to a second charge level that corresponds with the second voltage level 410 (i.e. the first excitation voltage level) over a first time period 418. In an embodiment, the first time period 418 corresponds with the time to charge capacitive node 116 to a charge level associated with the first excitation voltage level. In the illustrated example, the first charge change corresponds with a load voltage change 420 of 2.64 V in a positive direction.

Curve 422 represents a second charge change of capacitive node 116 in response to discharging capacitive node 116 following the application of the second excitation voltage level (i.e. the third voltage level 412). Throughout this disclosure, a charge change that corresponds with a transition to a lower charge level is also referred to as a negative swing. The second charge change transitions from a third charge level that corresponds with the third voltage level 412 (i.e. the second excitation voltage level) to a fourth charge level that corresponds with the fourth voltage level 414 (i.e. 0.66 V) over a second time period 424. In an embodiment, the second time period 424 corresponds with the time required to discharge capacitive node 116 from a charge level that corresponds with the second excitation voltage level to a charge level that corresponds with the fourth voltage level 414. In the illustrated example, the second charge change corresponds with a load voltage change 426 of 8.74 V in a negative direction, which can also be expressed as −8.74 V.

In the illustrated example, the combined magnitude of the first load voltage change and the second load voltage change yields an asymmetrical swing of 11.4 V. In another embodiment, the fourth voltage level 414 is equal to the first voltage level 408. In other words, in such an embodiment, the second charge change transitions back to a charge level that corresponds with the starting voltage level (i.e. the first voltage 408) of the positive swing.

In yet another embodiment, the polarities of the voltages levels (i.e., voltage levels 402, 404, 410, and 414) and the excitation voltages that are applied to the electrode 204 of capacitive node 116 may be negated or inverted such that the voltage levels are negative with respect to GND. For example, applying negative voltage levels to the electrode 204 may result in curves similar to curves 416 and 422 that are mirrored over axis 402. In such an embodiment, where negative voltage levels are applied to the electrode 204, a negative swing transitions from a first negative voltage level to a second negative voltage level such that, for example, the second negative voltage level is more negative than the first negative voltage level. A positive swing transitions from a third negative voltage level to a fourth negative voltage level. The third negative voltage level is more negative than the second negative voltage level. The fourth negative voltage level is less negative than the second negative voltage level. Generating and applying negative voltage levels may be performed using any suitable technique as would be appreciated by one of ordinary skill in the art.

Figure 5:
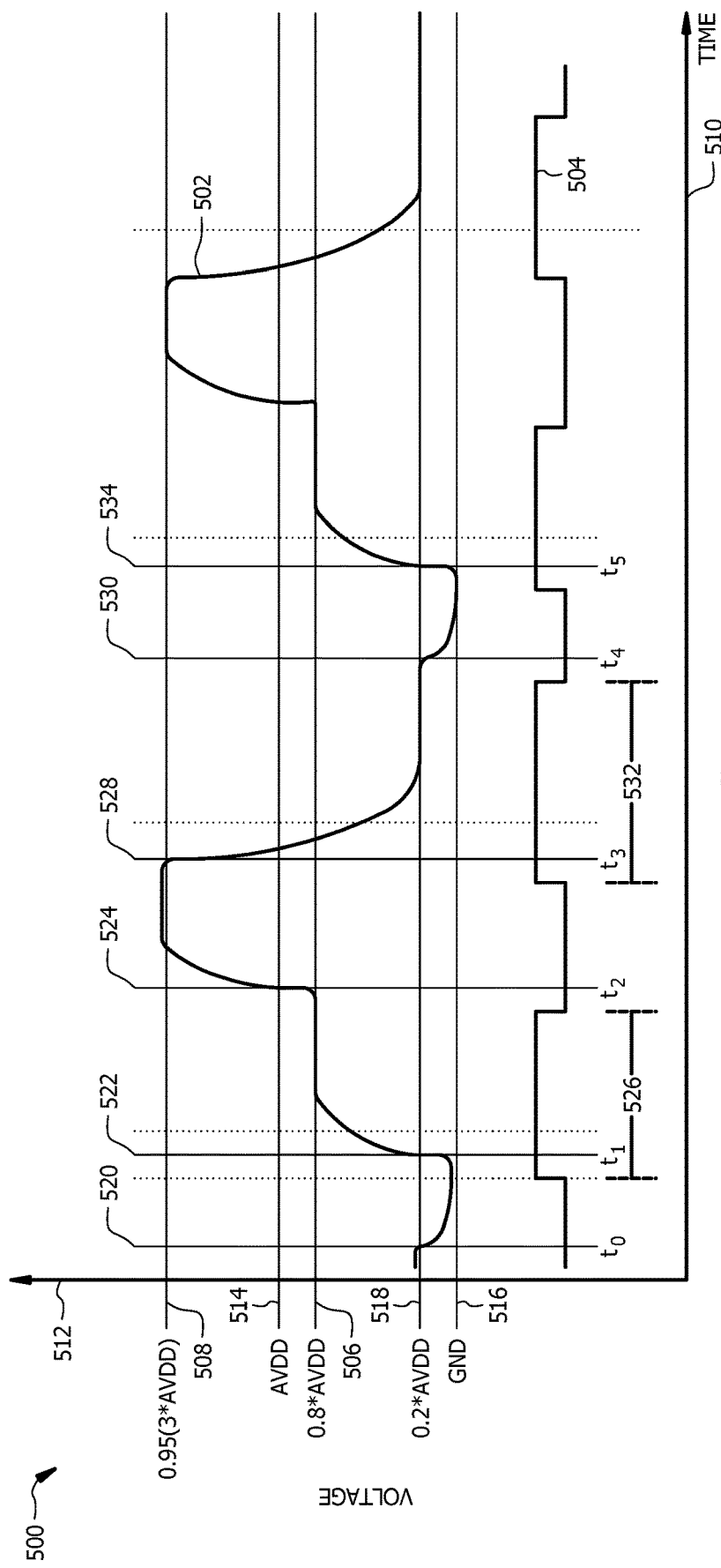
FIG. 5 illustrates an example timing diagram of a charge response of a capacitive node in a touch sensor in response to applied excitation voltages over time, based on a corresponding integration waveform, according to an embodiment of the present disclosure.

FIG. 5 illustrates an example timing diagram 500 of a charge response 502 of a capacitive node 116 in a touch sensor 102 in response to applied excitation voltages over time, based on a corresponding integration waveform 504, according to an embodiment of the present disclosure. In an embodiment, the asymmetrical excitation voltage levels (e.g. voltage levels 506 and 508) may be applied by a touch sensor controller 108 to an electrode of touch sensor 102 as a drive signal to charge capacitive node 116. The integration signal 504 may be applied by touch sensor controller 108 to a measurement circuit 200 to thereby cause the measurement circuit 200 to measure load voltage changes while touch sensor controller 108 charges and discharges capacitive node 116. Thus, it is noted that waveform 504 represents an integration enable signal for a measurement circuit 200, and may be, in one example, a waveform (e.g. a square wave) that toggles between a low state (e.g. logical "0") and a high state (e.g. logical "1"). In one embodiment, the measurement circuit 200 is configured to perform an integration of capacitive node 116 charge levels as a result of waveform 504 being in the high state. For example, measurement circuit 200 may be configured to measure the change in charge of capacitive node 116 over predetermined time intervals that correspond with when waveform 504 is an a particular state, for example, when waveform 504 is in the high state.

Axis 510 indicates time, for example, in microseconds, and axis 512 indicates voltage, for example, in volts. Timing diagram 500 illustrates five voltage levels 506, 508, 514, 516, and 518 of the capacitive node voltage 502. In an embodiment, one or more of the voltage levels may be derived from a reference voltage (AVDD) 514. Referring to FIG. 4 as an example, a first voltage level 516 is set at GND or 0 V, a second voltage level 504 is set to the first excitation voltage which is set at 80% of the reference voltage 514, a third voltage level 506 is set to the second excitation voltage which is set at 95% of three times the reference voltage 514, and a fourth voltage level 518 is set at 20% of the reference voltage 514. The voltage levels shown and described in FIG. 5 are provided for illustrative purposes only and not intended to be limiting. Alternatively, any other voltage levels may be used as would be appreciated by one of ordinary skill in the art.

During the time period from time $t_0$ 520 to time $t_1$ 522, a touch sensor controller 108 performs a pre-charge on capacitive node 116 by applying the first voltage level 516 to set capacitive node 116 to a first charge level that corresponds with the first voltage level 516. During the time period from time $t_1$ 522 to time $t_2$ 524, touch sensor controller 108 applies the first excitation voltage (i.e. the second voltage level 506) to capacitive node 116 which charges capacitive node 116 from the first charge level that corresponds with the first voltage level 516 to a second charge level that corresponds with the first excitation voltage level. Measurement circuit 200 performs a first integration to measure a first charge change (e.g. a positive swing) for a measured signal during a first time period 526 while touch sensor controller 108 charges capacitive node 116. Measurement circuit 200 measures the charge level of capacitive node 116 over first time period 526.

During the time period from time $t_2$ 524 to time $t_3$ 528, touch sensor controller 108 applies a second excitation voltage (i.e. the third voltage level 508) to capacitive node 116 which charges capacitive node 116 from the second charge level that corresponds with the first excitation voltage to a third charge level that corresponds with the second excitation voltage level. During the time period from time $t_3$ 528 to time $t_4$ 530, touch sensor controller 108 discharges capacitive node 116 which causes capacitive node 116 to discharge from the third charge level that corresponds with the second excitation voltage level to a fourth charge level that corresponds with a fourth voltage level 518. The fourth voltage level 518 is less than the second voltage level 504. The measurement circuit 200 performs a second integration to measure a second charge change (e.g. negative swing) for the measured signal during a second time period 532 while touch sensor controller 108 discharges capacitive node 116. In an embodiment, the first time period 526 is equal to the second time period 532. During the time period from time $t_4$ 530 to time $t_5$ 534, touch sensor controller 108 repeats the process of measuring the first charge change and the second charge change by precharging capacitive node 116 to the first voltage level 516.

Figure 6:
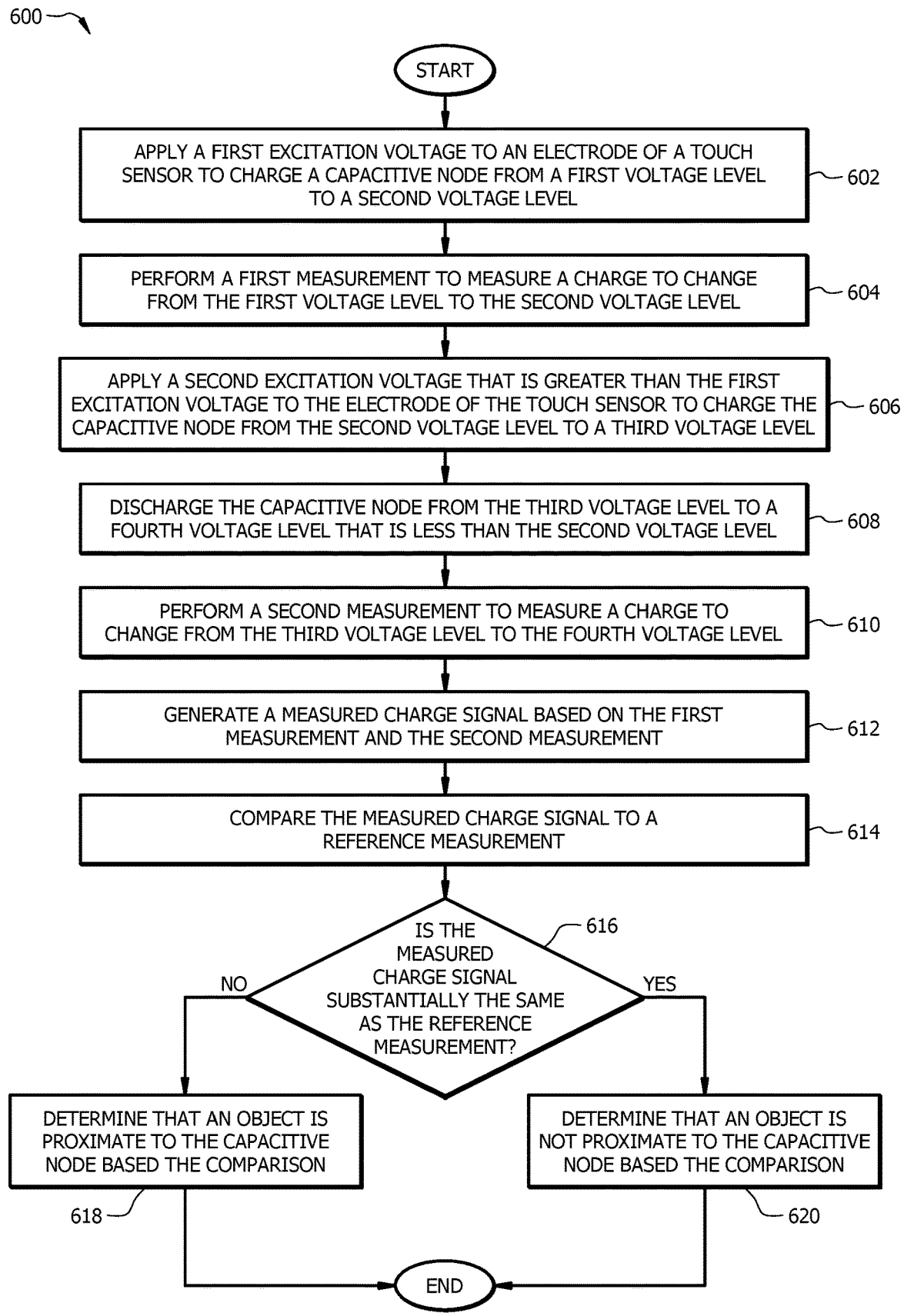
FIG. 6 illustrates an example of a capacitive node measurement method, according to an embodiment of the present disclosure.

FIG. 6 illustrates an example of a capacitive node 116 measurement method 600, according to an embodiment of the present disclosure. Method 600 is implemented by a touch sensor controller 108 to apply asymmetric excitation voltages as a drive signal to a capacitive node 116 in a touch sensor 102, for example, in a touch sensor array 106, to determine whether an object is proximate to capacitive node 116. Method 600 may be implemented to apply asymmetric excitation voltages to one or more capacitive nodes 116 and to measure the charge response of the one or more capacitive nodes 116 at each line or each axis of the touch sensor. Further, method 600 may be implemented to apply asymmetric excitation voltages to all of the electrodes 204 in the touch sensor 102 or a subset of all the electrodes 204 in the touch sensor 102 at once.

At step 602, touch sensor controller 108 applies a first excitation voltage to an electrode 204 in a touch sensor 102 to charge capacitive node 116 associated with electrode 204 from a first voltage level (e.g. first voltage level 516 in FIG. 5) to a second voltage level (e.g. the second voltage level 506 in FIG. 5). The second voltage level is equal to the first excitation voltage and is greater than the first voltage level. At step 604, touch sensor controller 108 performs a first measurement to measure a charge to change from the first voltage level to the second voltage level. In an embodiment, touch sensor controller 108 performs a first integration for a first time period (e.g. first time period 526 in FIG. 5) while charging capacitive node 116 to measure the charge change (e.g. a positive swing) from the first voltage level to the second voltage level. For example, touch sensor controller 108 may enable or employ a measurement circuit 200 to perform the first integration while charging capacitive node 116.

At step 606, touch sensor controller 108 applies a second excitation voltage that is greater than the first excitation voltage to electrode 204 in touch sensor 102 to charge capacitive node 116 from the second voltage level to a third voltage level (e.g. the third excitation voltage level 508 in FIG. 5). The third voltage level is equal to the second excitation voltage and is greater than the second voltage level. For example, the second excitation voltage may be three times greater than the first excitation voltage. The second excitation voltage may be greater than the first excitation voltage by any amount. In an embodiment, applying the second excitation voltage comprises amplifying the first excitation signal to the second excitation voltage level. For example, a charge pump (e.g. a capacitor pump or a level shifter) may be employed to increase or amplify the first excitation voltage to generate the second excitation voltage. In another embodiment, applying the second excitation voltage comprises obtaining the second excitation voltage from an external voltage source or a second voltage source. Alternatively, any other technique for generating or obtaining the second excitation voltage may be employed as would be appreciated by one of ordinary skill in the art. At step 608, touch sensor controller 108 discharges capacitive node 116 from the third voltage level to a fourth voltage level (e.g. fourth voltage level 518 in FIG. 5) that is less than the second voltage level. In one embodiment, the fourth voltage level may be the same voltage level as the first voltage level (e.g. first voltage level 516 in FIG. 5). In another embodiment, the fourth voltage level may be a different voltage level than the first voltage level. At step 610, touch sensor controller 108 performs a second measurement to measure a charge to change from the third voltage level to the fourth voltage level. In an embodiment, touch sensor controller 108 performs a second integration for a second time period (e.g. second time period 532 in FIG. 5) to measure the charge change (e.g. a negative swing) from the third voltage level to the fourth voltage level. For example, touch sensor controller 108 may enable or employ the measurement circuit 200 to perform the second integration while discharging capacitive node 116. In an embodiment, the first time period and the second time period are equal or substantially the same.

At step 612, touch sensor controller 108 generates a measured charge signal based on the first measurement and the second measurement. For example, the generated measured charge signal may correspond with a load voltage change at the capacitive node 116. In one embodiment, touch sensor controller 108 may generate the measured charge signal by combining the first measurement and the second measurement to create a full period or cycle of the measured charge signal. In an embodiment, the first measurement corresponds with a positive swing and the second measurement corresponds with a negative swing and combining the positive swing and the negative swing may form a saw tooth-like or triangle wave-like signal.

In an embodiment, the first measurement corresponds with a positive load voltage change that comprises a first noise component. The second measurement corresponds with a negative load voltage change that comprises a second noise component. In an embodiment, the first noise component and the second noise components may be external noise components. The magnitude of the second measurement is different than the magnitude of the first measurement. For example, the magnitude of the negative load voltage change may be greater than the magnitude of the positive load voltage change. The second noise component has the opposite polarity of the first noise component. The magnitude of the first noise component is substantially the same as the second noise component. Combining the first measurement and the second measurement may substantially cancel or reduce one or more of the first noise component and the second noise component and improve the SNR of the generated measured charge signal. For example, the SNR of the generated measured charge signal may be characterized using the following equation:

$$\frac{(V1+N1)-(V2+N2)}{(N1+N2)} = \frac{V1+N1+V2-N2}{(N1+N2)} = \frac{V1+V2}{(N1+N2)}. \quad (1)$$

where V1 represents a magnitude of a first voltage change (e.g. a positive voltage change) from the first voltage level to the second voltage level, N1 represents a first noise component associated with the first voltage change, V2 represents a magnitude of a second voltage change (e.g. a negative voltage change) from the third voltage level to the fourth voltage level, and N2 represents a second noise component associated with the second voltage change. In Equation 1, noise cancellation is not dependent of the magnitude of the first voltage change or the second voltage change when the noise components are substantially the same between two measurement periods (e.g. integration periods) and can cancel each other out. Using the same measurement time for each measurement phase may keep the external noise components the substantially same. The same measurement time may be used for the first measurement and the second measurement even if the settling time is different for a positive voltage change and a negative voltage change.

At step 614, touch sensor controller 108 compares the measured charge signal to a reference measurement to determine whether the measured charge signal and the reference measurement are substantially the same. The reference measurement is a predetermined value that is based on the capacitance of capacitive node 116 when an object is not proximate to capacitive node 116. The reference measurement may be derived based on known capacitances of capacitive node 116 when an object is not proximate to capacitive node 116. The measured charge signal is based on the current capacitance of capacitive node 116. The measured charge of capacitive node 116 may be the same as the reference measurement when the capacitance at capacitive node 116 is unchanged, for example, when an object is not proximate to capacitive node 116, or may be different than the reference measurement when the capacitance at capacitive node 116 changes, for example, in response to an object being proximate to capacitive node 116.

At step 616, touch sensor controller 108 proceeds to step 618 when the measured charge signal and the reference measurement are different. Otherwise, touch sensor controller 108 proceeds to step 620 when the measured charge signal and the reference measurement are substantially the same. At step 618, touch sensor controller 108 determines that an object is proximate to capacitive node 116 based on the comparison. The difference between the measured charge signal and the reference measurement may imply a change of the capacitance at capacitive node 116, and therefore touch sensor controller 108 determines that an object is proximate to capacitive node 116. In an embodiment, touch sensor controller 108 may generate and/or output an electrical signal that indicates an object is proximate to capacitive node 116 in response to the determination.

Returning to step 616, touch sensor controller 108 proceeds to step 620 when the measured charge signal and the reference measurement are substantially the same or equal. At step 620, touch sensor controller 108 determines that an object is not proximate to capacitive node 116 based on the comparison. The absence of a difference between the measured charge signal and the reference measurement may imply there is no change of capacitance at capacitive node 116, and therefore touch sensor controller 108 determines that an object is not proximate to capacitive node 116. In an embodiment, touch sensor controller 108 may generate and/or output an electrical signal that indicates an object is not proximate to capacitive node 116 in response to the determination.

Figure 7:
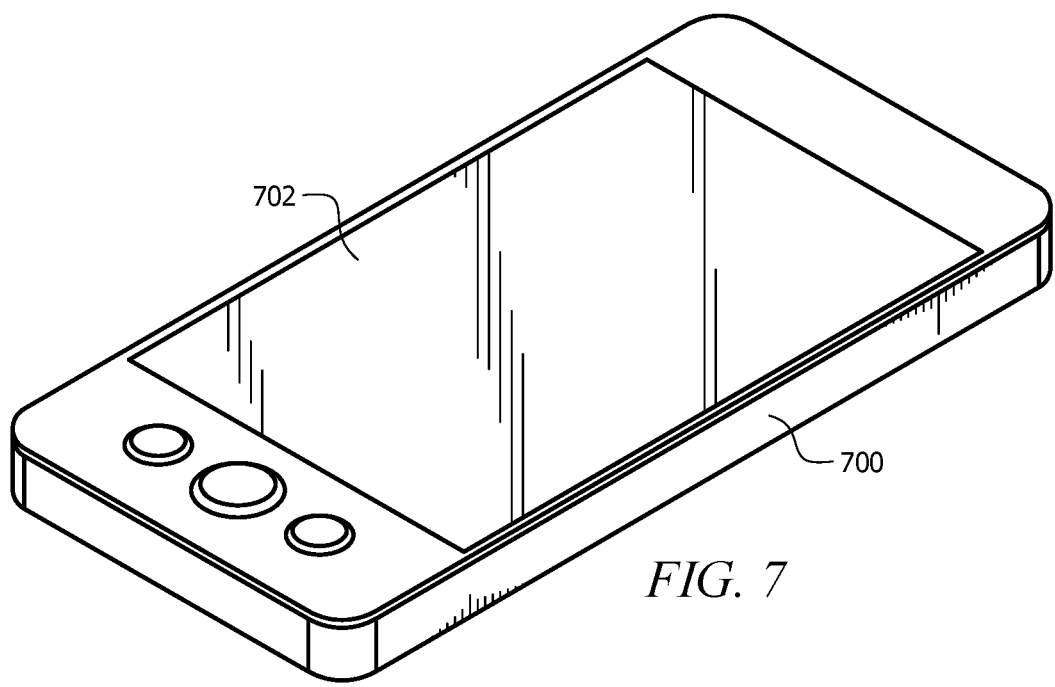
FIG. 7 illustrates an example of a device that uses a touch sensor, according to an embodiment of the present disclosure.

FIG. 7 illustrates an example of a device 700 that uses a touch sensor, according to an embodiment of the present disclosure. In an embodiment, the touch sensor of device 700 is touch sensor 102. Touch sensor 102 may be incorporated within device 700. Device 700 includes any personal digital assistant, cellular telephone, smartphone, tablet computer, and the like. In an embodiment, device 700 includes other applications such as automatic teller machines (ATMs), home appliances, personal computers, and any other such device having a touchscreen. For example, a certain embodiment of device 700 is a smartphone that includes a touchscreen display 702 occupying a significant portion of a surface of the device. In an embodiment, the large size of touchscreen display 702 allows the touchscreen display 702 to present a wide variety of data, including a keyboard, a numeric keypad, program or application icons, and various other interfaces as desired. In an embodiment, a user interacts with device 700 by touching touchscreen display 702 with an object, such as for example a stylus or a finger, to interact with device 700 (i.e., select a program for execution or to type a letter on a keyboard displayed on the touchscreen display 702). In an embodiment, a user interacts with device 700 using multiple touches to perform various operations, such as to zoom in or zoom out when viewing a document or image. In an embodiment, such as home appliances, touchscreen display 702 does not change or changes only slightly during device operation, and recognizes only single touches.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   one or more processors; and
   one or more memory units coupled to the one or more processors, the one or more memory units collectively storing logic, the logic being executed by the one or more processors so as to cause the one or more processors to perform operations comprising:
   applying a first excitation voltage to an electrode of a touch sensor, applying the first excitation voltage to the electrode charges, with a first charge, a capacitive node associated with the electrode from a first voltage level to a second voltage level that is greater than the first voltage level;
   performing a first charge measurement to measure the change from the first voltage level to the second voltage level;
   applying a second excitation voltage to the electrode of the touch sensor, applying the second excitation voltage to the electrode charging the capacitive node from the second voltage level to a third voltage level that is greater than the second voltage level;
   discharging the capacitive node from the third voltage level to a fourth voltage level that is less than the second voltage level;
   performing a second charge measurement to measure the change from the third voltage level to the fourth voltage level; and
   generating a measured charge signal based on the first charge measurement and the second charge measurement;
   wherein the first excitation voltage and the second excitation voltage are each derived from a reference voltage.

2. The apparatus of claim 1, wherein
   generating the measured charge signal based on the first charge measurement and the second charge measurement comprises combining the first charge measurement and the second charge measurement.

3. The apparatus of claim 1, wherein the operations further comprise:
   comparing the measured charge signal to a reference measurement; and
   determining that an object is within a detection distance of the touch sensor based on a difference between the measured charge signal and the reference measurement.

4. The apparatus of claim 1, wherein:
   the first charge measurement is a first integration performed over a first time period,
   the second charge measurement is a second integration performed over a second time period, and
   the first time period and the second time period are equal.

5. The apparatus of claim 1, wherein applying the second excitation voltage comprises amplifying the first excitation voltage.

6. The apparatus of claim 1, wherein a signal to noise ratio of the measured charge signal is characterized as follows:

$$\frac{(V1+N1)-(V2+N2)}{(N1+N2)}$$

where V1 represents a magnitude of a first voltage change from the first voltage level to the second voltage level, N1 represents a first noise component associated with the first voltage change, V1+N1 represents the first charge measurement, V2 represents a magnitude of a second voltage change from the third voltage level to the fourth voltage level, N2 represents a second noise component associated with the second voltage change, and V2+N2 represents the second charge measurement.

7. The apparatus of claim 1, wherein a magnitude of the first charge measurement is different than a magnitude of the second charge measurement.

8. The apparatus of claim 1, wherein the first voltage level and the fourth voltage level are different.

* * * * *